July 17, 1962
D. L. WATROUS
3,044,349
OPTICAL PYROMETER APPARATUS
Original Filed Feb. 26, 1957
4 Sheets-Sheet 2
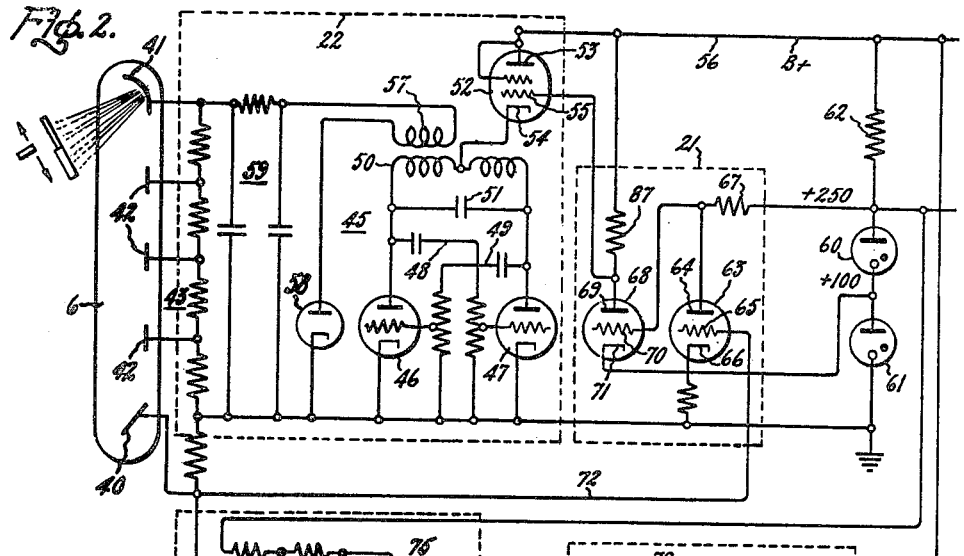
Fig. 2.
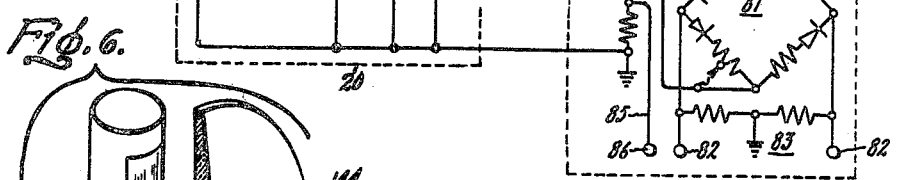
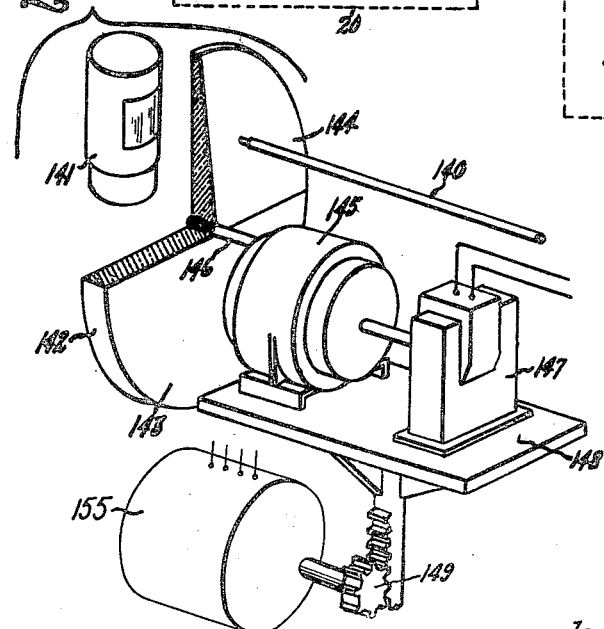
Fig. 6.
Fig. 7.
Inventor
Donald L. Watrous
by I. David Blumenfeld
His Attorney July 17, 1962 — D. L. WATROUS — 3,044,349
OPTICAL PYROMETER APPARATUS
Original Filed Feb. 26, 1957 — 4 Sheets-Sheet 3

Inventor
Donald L. Watrous
by I. David Blumenfeld
His Attorney

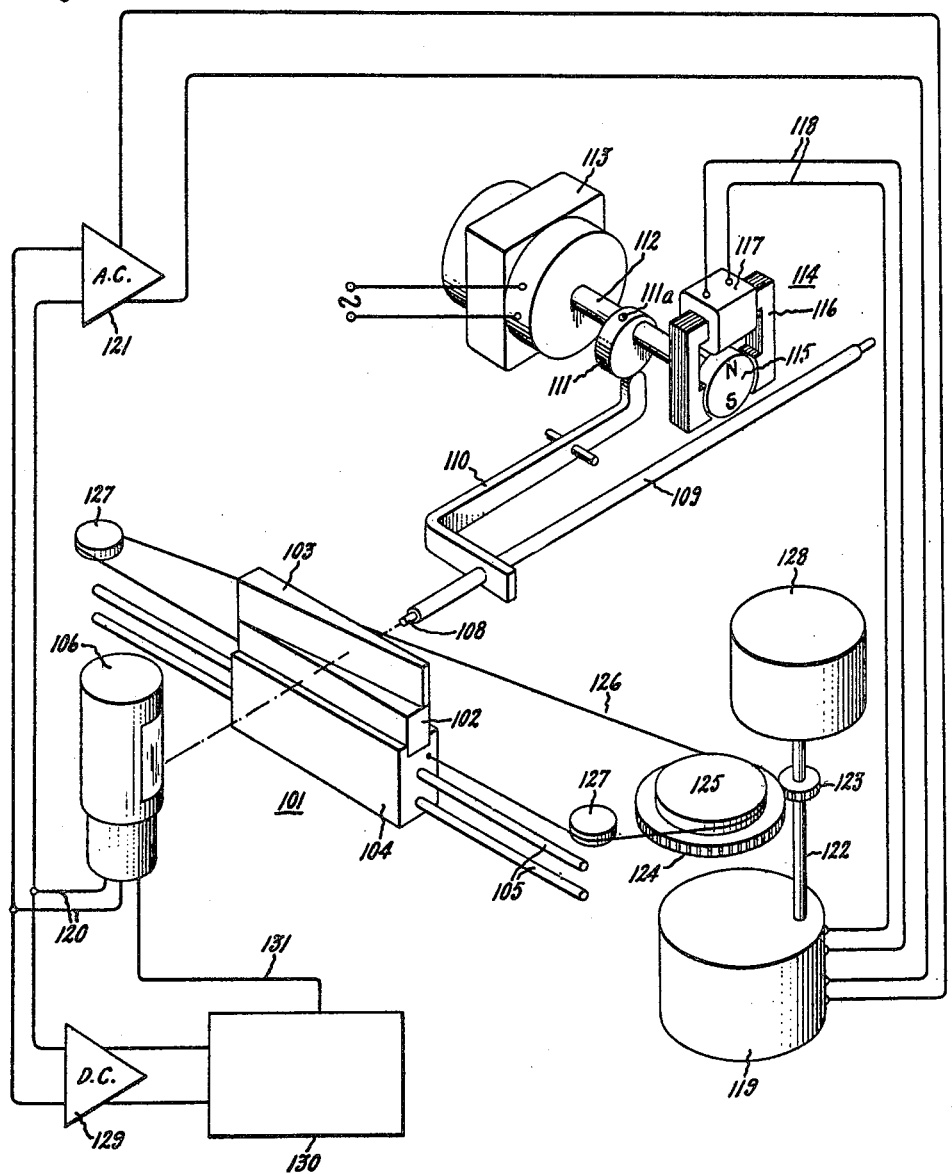

United States Patent Office 3,044,349
Patented July 17, 1962

3,044,349
OPTICAL PYROMETER APPARATUS
Donald L. Watrous, Scotia, N.Y., assignor to General Electric Company, a corporation of New York
Original application Feb. 26, 1957, Ser. No. 642,473, now Patent No. 2,927,502, dated Mar. 8, 1960. Divided and this application Dec. 28, 1959, Ser. No. 862,141
4 Claims. (Cl. 88—22.5)

This invention is a division of my copending application Serial No. 642,473, filed February 26, 1957 which is now Patent No. 2,927,502 assigned to the assignee of the present invention.

This invention relates to a high temperature pyrometer apparatus, and more specifically, to a continuous null balancing remote indicating color temperature pyrometer.

The trend toward ever mounting temperatures in industrial processes makes it imperative to develop increasingly accurate and sensitive techniques for measuring and controlling high temperatures. The improvements in metallurgical processes, such as in the heat treatment of steel, require accurate temperature measurement and control on a large production basis. Similarly, the increasing use of high temperature furnaces, and high temperature combustion processes accentuates the need for rapid, accurate and continuous high temperature measuring techniques.

One of the consequences of this movement toward ever higher temperatures has been to make conventional devices, based on direct contact, obsolescent. Hence, it is necessary to utilize other approaches in the high temperature field.

One approach to the problem is based on measuring the radiant energy emitted by a heated source. These so-called radiation pyrometers rely on the principle that the rate at which a heated object emits radiant energy depends on and is proportional to the fourth power of the absolute temperature. In devices of this type the radiant energy is focussed on the hot junction of a small thermopile, or a photoelectric device, and produces an output whch is proportional to the magnitude of the radiant energy.

However, since these devices depend upon the radiation intensity to provide a measure of the temperature, they are susceptible to errors which can introduce serious inaccuracies. Thus, whenever the radiation from the source to be measured must pass through an appreciable amount of smoke or dust the intensity falling on the radiation sensitive device is reduced by virtue of the absorption and produces serious errors in the temperature indication. In addition radiation pyrometers are distance sensitive since intensity varies inversely with the square of the distance.

Furthermore, instruments of this type are very sensitive to changes in the emissivity of emittance of the source whose temperature is to be measured. The emittance or emissivity of a body or source is defined as the ratio of radiant energy emitted in unit time by unit area of a body to that emitted by a perfect radiator (black body) at the same temperature. Thus, radiation pyrometers are instruments which should, theoretically, measure the correct temperature of a black body by measuring the radiation intensity; however, due to the fact that all bodies are not black bodies and possess different emissive powers, an instrument of this type will give a wrong temperature indication for bodies of differing emissive powers but of the same temperature. As a consequence, radiation pyrometers which utilize the radiation intensity as a measure of the temperature are of limited utility.

Another prior art approach to high temperature measurement which solves some of the problems has been the so-called optical color temperature pyrometer. Color temperature is an indication of the spectral composition of the radiant energy emitted by the source and is measured in degrees Kelvin. It is equivalent to the absolute temperature to which a black body would have to be heated to give a color matching the radiant energy emitted by a source in question.

This type of apparatus relies on the physical principle that the spectral distribution of radiated energy from a heated source is a function of temperature, and this spectral distribution changes with changes of temperature. Thus, for a given temperature of a heated source the ratio of energy emitted at various wavelengths or bands of wavelengths is a fixed quantity dependent on the temperature. If the temperature of the source changes, the ratio of energy at the various wavelengths and bands of wavelengths also changes. Thus, by knowing the ratios of intensities at selected bands it is possible to determine the absolute temperature of a heated source.

The devices utilizing the above principle have, however, certain limitations which severely circumscribe their utility. One of these prior art devices consists of a wedge-shaped filter which transmits a fixed amount of red but a varying amount of green. Observing a heated or incandescent source through the filter there is one point therealong at which the ratio of red and green is such that the two colors appear as a whitish yellow mixture. An increase in temperature of the source increases the green content of the radiation, since the spectral distribution has been changed, and thus moves the point at which the whitish yellow mixture is observed along the wedge. This change in position is a measure of the temperature change of the source. It is obvious, of course, that this type of apparatus has a number of serious shortcomings. The principal difficulty is that it relies on the human eye, a notoriously unreliable device, to detect and duplicate the point at which the two colors are matched. Furthermore, since the color sensitivity of the human eye varies from observer to observer, an additional source of error is introduced if different operators utilize the same equipment. In addition, color matching requires manipulating the wedges and consequently introduces manual operatons which are insurmountable limitations in high speed processes or those in which rapidly changing temperature conditions occur.

Another prior art device contemplates simultaneously measuring the intensities of two monochromatic radiations by means of a pair of photoelectric devices and measuring the ratio of the current flowing therefrom. While this system is adequate for many purposes, it necessitates manual operation in order to achieve an indication of the ratio and in utilizing a pair of photoelectric devices it requires identical operating characteristics for the photoelectric devices. Thus, this device is inherently susceptible to errors and of dubious value in processes which are subject to rapidly changing conditions.

It is an object of this invention, therefore, to provide a continuous null balancing optical pyrometer.

A further object of this invention is to provide a continuous remote indicating optical color temperature pyrometer.

Yet another object of this invention is to provide a pyrometer which is unaffected by errors due to changes in the emittance of the source to be measured and absorption of the radiated energy reaching the measuring device.

An additional object is to provide a rapid, accurate, and continuous color temperature pyrometer.

Other objects of this invention will become apparent as the description proceeds.

In accordance with the invention, the foregoing objects are accomplished by providing an apparatus, broadly speaking, in which the amounts of energy in selected bands of wavelengths are compared. There is provided an element, such as a band pass filter, which transmits energy in a selected band of wavelengths in the radiation spectrum emitted by the source. A second band pass filter passes energy in a different portion of the radiation spectrum. This second device is of the type having graduated transmission characteristics. Thus, its band pass characteristics are constant but the percent transmission varies in various portions of the device.

The radiation spectrum from the source to be measured is cyclically applied to a radiation sensitive device alternately through the first and second of these devices to produce an electrical output responsive to the amount of energy in each of the selected bands. The output signal is utilized to move the means in such a direction that the energy spectrum from the source to be measured passes through that portion of the second selective transmission device such that equal amounts of energy in each band are transmitted onto a radiation sensitive device. Since the ratio of energies in two selected bands for a given temperature is fixed, the amount of movement of the second means necessary in order to make the energies transmitted equal depends on the particular temperature and is a measure thereof.

The novel features which are believed to be characteristic of this invention are set forth with particularity in the appended claims. The invention itself, however, both as to its organization and method of operation together with further objects and advantages thereof, may best be understood by reference to the following description taken in connection with the accompanying drawing in which:

FIGURE 2 is a diagrammatic showing of the electrical circuitry of the apparatus of FIGURE 1;

FIGURE 5 is an alternative form of the pyrometer apparatus of FIGURE 1;

FIGURE 6 is yet another apparatus embodying the principles of the instant invention; and FIGURE 7 shows a rotating sector wheel type of filter and wedge which may be utilized with the apparatus of FIGURE 6.

Figure 1:
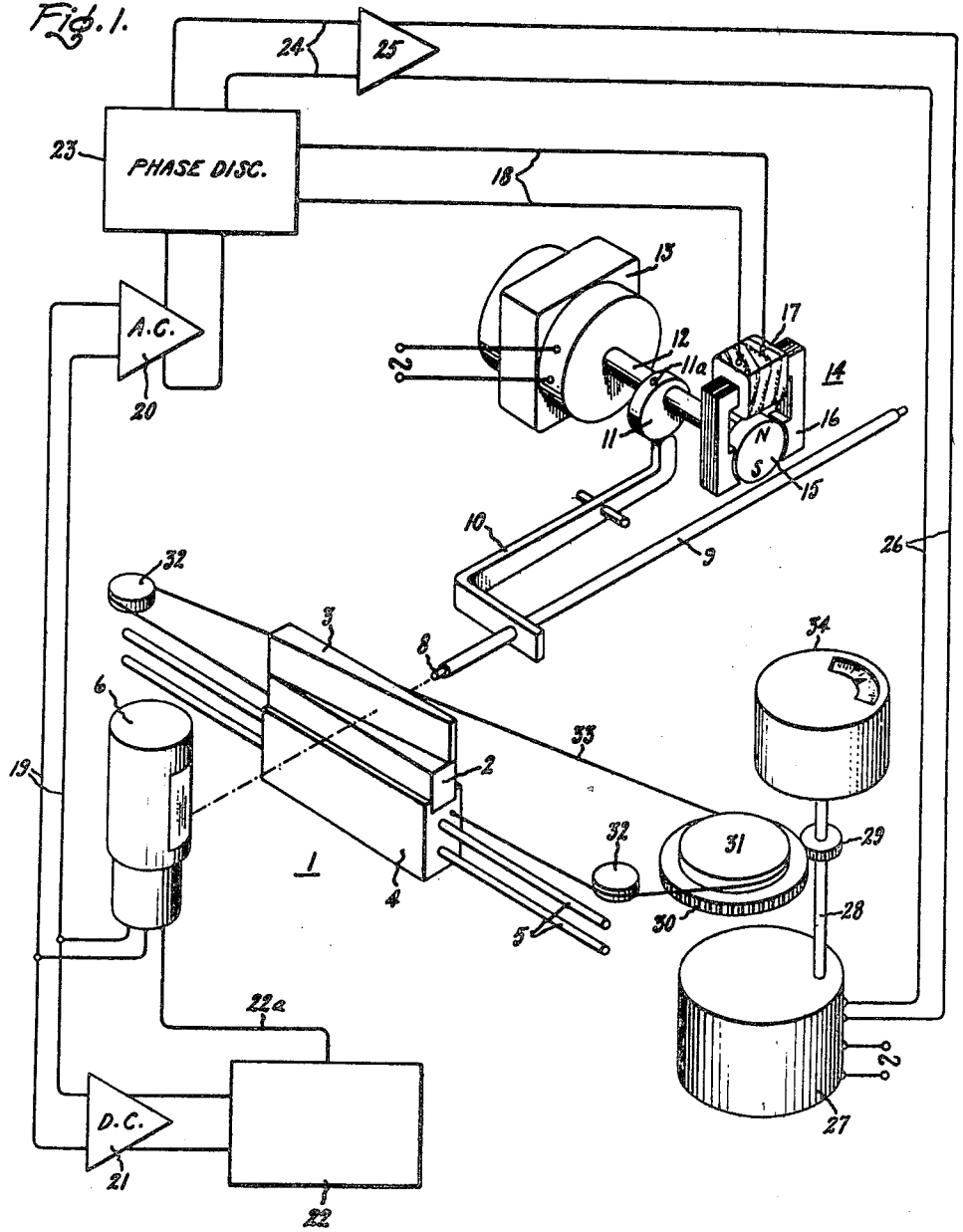
FIGURE 1 is a diagram of a pyrometer apparatus embodying the principles of this invention.

As has been pointed out previously, the primary physical principle upon which the instant invention is grounded is that the spectral distribution of radiated energy from a heated source is a function of the temperature of that source, and that this spectral distribution varies with changes in temperature. That is, for a given temperature the amount of radiant energy in the spectrum of wavelengths being emitted by a heated source is directly related to the temperature of that source. At a different temperature the amount of radiant energy at the various wavelengths of the spectrum changes in a manner dependent upon the change in temperature. Thus, for example, at the lower temperatures the spectral distribution curve tends to be centered in the infrared region of the spectrum so that more of the energy emitted is in the infrared portion of the spectrum. On the other hand, at the higher temperatures the spectral distribution curves tend to be centered more toward the green end of the spectrum and, as a consequence, the radiant energy emitted by the heated source tends to contain more energy in the green portion of the spectrum.

It follows, then, that the amount of energy in two discrete bands of spectrum depends on the temperature of the emitting source and the ratio of the amount of energy is a fixed quantity dependent on the temperature. If the temperature of the source changes, the ratio of energy in the selected bands changes similarly.

By passing the radiant energy through a red and a green filter and by manipulating the amount of energy transmitted through the green filter means, which has variable transmission characteristics, equality may be achieved between the amounts of energy transmitted through the filters. Thus, for every temperature the manipulation in the green band necessary to bring the ratio of energies to unity; i.e., having equal amounts of energy fall on a radiation sensitive device, are different and provide an accurate measure of the temperature.

The term transmission characteristic, as used in this specification, means the ratio of the transmitted light intensity to the incident light intensity for a filter means and is usually defined in terms of percent transmission.

It is to be understood that for the sake of simplicity of explanation the color response of the radiation sensitive device is assumed to be linear. In actuality, as is obvious to the man skilled in the art, the color response characteristics of the device has to be taken into consideration in the calibration of the instrument.

The term selective wavelength characteristic, on the other hand, is used to describe the ability of a filter element to segregate selected portions of spectrum independent of its ability to transmit varying proportions of the wavelengths within that selected portion. Thus two filters may have the same selective wavelength characteristics (i.e., transmit the same band of wavelengths) but have different transmission characteristics (i.e., transmit different amounts of energy in that band of wavelengths).

Thus, by utilizing a wedge-shaped filter having a selective wavelength characteristic in the green portion of the spectrum and varying transmission characteristics for different points along the wedge it is possible to control the amount of energy passed in the green band by manipulating the point of the wedge at which radiant energy is transmitted until equality between the amount of energy passed in the infrared and green bands is achieved. Consequently, the point along the wedge at which this equality is achieved is then a measure of the temperature of the heated source.

Referring now to FIGURE 1, there is illustrated a continuous, null balancing, remote indicating pyrometer apparatus based on the principles of the instant invention. There is provided, broadly speaking, a transducer mechanism for radiant energy in the ultraviolet to infrared spectrum which includes first and second means having selective wavelength characteristics in two discrete bands of the spectrum and variable transmission characteristics in one of the bands. The radiation spectrum from the heated source to be measured is alternately applied through the first and second means to a radiation sensitive device which produces an electrical output proportional to the ratio of energies in the selected bands. The electrical output from the radiation sensitive device controls a means to vary the transmission characteristics of one of said means until the ratio of energies transmitted is unity, the amount of variation necessary to achieve unity ratio being an index of the temperature of the heated source.

A means 1, which has selective wavelength characteristics for at least two distinct bands of wavelengths in a received radiation spectrum, is provided in order to segregate two discrete bands of wavelengths from the radiation spectrum. A first uniform filter element 2, which is characterized by the fact that it passes only a selected band of wavelengths, has a pass band, for example, near the infrared end of the spectrum. The filter element 2 is further characterized by the fact that its transmission characteristic within its selected band of wavelengths is constant along all points of the filter element. The filter 2 shall hereafter be called the red filter in order to facilitate further description, although it is to be understood that filters other than those having a band pass characteristic at the infrared end may be utilized.

Positioned on top of the red filter 2 and fastened thereto by means of an adhesive, or any other adequate fastening means, is a second band pass filter 3. The filter 3 is a physical wedge with a lengthwise taper which will pass a band of wavelengths in another portion of the spectrum, such as, for example, the green portion of the spectrum. The transmission characteristics of this filter varies, however, with position along the tapered wedge 3. Thus, at the narrow end of the wedge the transmission characteristic (the ratio of light intensities) is large whereas at the thick end it is much less. The filter 3 will hereafter be denominated as the green filter to distinguish it from the filter 2 or red filter, although, the present invention is not limited to green filters.

The filters 2 and 3 are positioned on a carriage means 4 which in turn is slidably mounted on a pair of tracks 5 along which it is adapted to move. The manner of moving the carriage along the tracks 5 will be explained in detail later.

Positioned on one side of the red and green filters is a radiation sensitive device 6 which in a well known manner provides an electrical output proportional to the amount of radiant energy impinging thereon. The device 6 is preferably a photomultiplier although other types of radiation sensitive devices may be utilized.

Arranged on the other side of the filters 2 and 3 is a movable remote transmitting means to apply the radiation spectrum from a heated source to the radiation sensitive device alternately through the filters 2 and 3. An elongated flexible quartz rod 8 positioned in a hollow thin-walled stainless steel protective tubing 9 constitutes the remote transmitting means. One end of the quartz rod 8 is positioned within or closely adjacent to the heated source whose temperature is to be determined whereas the other end is positioned in juxtaposition to the filter members 2 and 3.

A mechanism cyclically flexes one end of the quartz rod 8 in a direction transverse to the filters 2 and 3 thus alternately applying the radiation spectrum from the heated source through the filters 2 and 3 and onto the radiation sensitive device 6. The quartz rod 8 is supported at one end thereof by a pivoted rocker arm 10 which is actuated in a reciprocating fashion to flex the quartz rod 8. The reciprocating motion is imparted to the rocker arm 10 by means of a cam member 11 which is eccentrically mounted on a shaft 12 and driven by a motor 13.

A reference or timing voltage generator is driven in synchronism with the cam member 11 and provides a reference voltage of fixed frequency and adjustable phase. The reference generator 14 comprises a circular magnetically polarized rotor member 15, the poles being indicated by the reference letters N and S, fastened to the shaft 12 and positioned in the air gap of a core member 16. Mounted in flux exchanging relationship with the core member 16 is a coil member 17 which will have induced therein an alternating voltage whose frequency is synchronous with the rotation of the cam member 11 and consequently with the movement of the quartz rod 8. The coil 17 is connected by means of leads 18 to the input of a phase discriminator 23 wherein the phase of the reference or timing signal is compared to the phase of the electrical output from the radiation sensitive device 6. The cam member 11 and the polarized rotor member 15 of the reference signal generator are positioned in such a manner that the reference voltage provided by the generator 14 normally assumes a 90° phase relationship with the output of the radiation sensitive device 6. The precise manner in which this is achieved will be explained in greater detail later in connection with a description of the operation of the apparatus.

The electrical output of the radiation sensitive device 6 is characterized by the fact that it has an alternating current component whose phase is dependent on which of the filters, the red or green, passes the larger amount of energy and whose magnitude is dependent on their ratio. This may be most clearly shown with the aid of FIGURES 3a–3c which illustrate the idealized waveforms of the electrical output from the radiation sensitive device for three distinct conditions, wherein the electrical output V is plotted along the ordinates and the position of the quartz transmitting rod relative to the red and green filters is plotted along the abscissa.

Figure 3A:
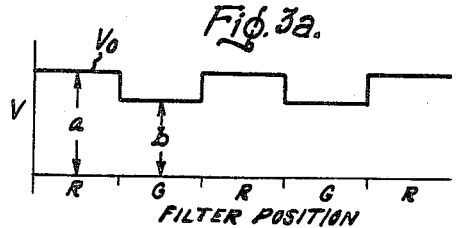
FIGURES 3a–3c illustrate the waveforms of the electrical output from the radiation sensitive device of FIGURE 1.

FIGURE 3a illustrates the condition wherein the larger amount of energy passes through the red filter 2. If for the particular temperature the red filter 2 passes the greater amount of energy, the electrical output from the radiation sensitive device when the quartz rod is traversing the red filter is represented by the ordinate $a$. As the quartz transmitting rod traverses the green filter the output amplitude from the radiation sensitive device is represented by the ordinate $b$ which is of lesser magnitude than the ordinate $a$ since, as has been postulated, the amount of energy passed by the green filter 3 is less than that by the red filter 2. As a consequence, the electrical output from the radiation sensitive device for this condition is of the type illustrated in FIGURE 3a and constitutes a direct current component having an alternating component superimposed thereon.

Figure 3B:
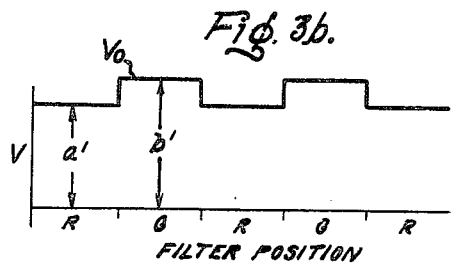

FIGURE 3b, on the other hand, illustrates the condition which is the reverse of that described with respect to FIGURE 3a. That is, the temperature condition is such that the green filter 3 passes more energy in its band than does the red filter 2. As can be seen the output from the radiation sensitive device when the quartz rod is traversing the red filter 2 as represented by the ordinate $a'$ is now less than that represented by the ordinate $b'$ which represents the output from the radiation sensitive device when the rod is traversing the green filter 3. It is obvious from examining FIGURE 3b that the alternating current component of this curve will be 180° out of phase with that for FIGURE 3a. Thus, for the two conditions; i.e., one or the other of the filters passing a larger amount of radiant energy, there will be produced by the radiation sensitive device 6 an electrical output having alternating current voltage components, the phases of which are 180° apart depending on which of the filter elements passes the larger amount of radiant energy.

Figure 3C:
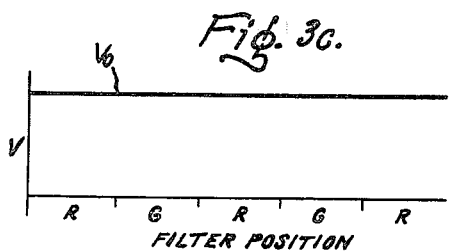

FIGURE 3c illustrates yet a third condition when equal amounts of energy are transmitted through the red and green filters. As can be seen from this figure the output of the radiation sensitive device for this condition is a constant direct current having no alternating component.

The output leads 19 from the radiation sensitive device 6 are connected to the input of an alternating current amplifier 20 which amplifies the alternating current component of the output. The output of the alternating current amplifier 20 is connected to the input of the phase discriminator 23 wherein it is compared to the output of the reference generator 14 and which produces a direct current output whose magnitude is proportional to their phase difference. The output of discriminator 23 is connected by means of the leads 24 to the input of a balance motor amplifier 25.

The balance motor amplifier 25 may include a vibrating converter or chopper which transforms the direct current output of the discriminator into an alternating current the phase of which is dependent on the sign of the direct current output from the discriminator. The output of the amplifier 25 is connected by means of leads 26 to a reversible balancing motor 27 which, through a driving mechanism presently to be described, actuates the carriage 4 supporting the red and green filter elements to bring the system to a null balanced position. The direction of rotation of the balancing motor 27 will be controlled by the phase of the output of the amplifier 25.

Figure 4A:
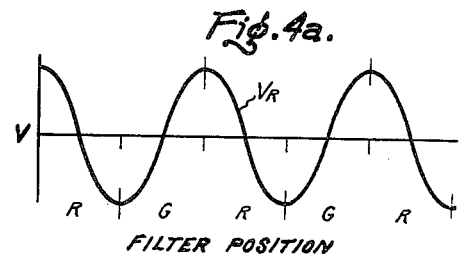
FIGURES 4a–4d illustrate the waveforms of the electrical signals applied to the phase discriminator of FIGURES 1 and 2.

FIGURES 4a–4d illustrate the relative phase relationships between the reference voltage from the generator 14 and the output from the radiation sensitive device for various conditions. Since these, or at least their alternating components, are applied to the phase discriminator 23 the phase relationships control the output of the discriminator and consequently the rotation of the balance motor 27. FIGURE 4a is a showing of the waveform $V_r$ of the reference signal in which voltage is plotted along the ordinate and time along the abscissa. The phase of this voltage is fixed by the relative positions of the cam member 11 and rotor member 15 of the generator 14 and may be changed by varying their relative positions through the position adjusting pin 11a on the cam member 11.

Figure 4B:
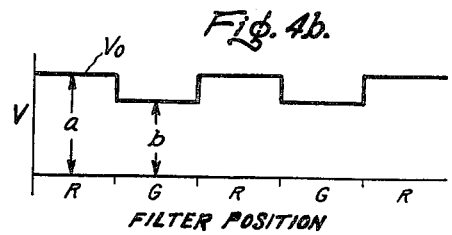

FIGURE 4b shows the output $V_o$ from the radiation sensitive device for the condition wherein the red filter 2 passes the greater quantity of radiant energy. It is clear from an examination of FIGURES 4a and 4b that the alternating component of $V_o$ lags the reference voltage $V_r$ by 90°. As a result the output of the discriminator 23 is a direct current voltage of a given sign.

Figure 4C:
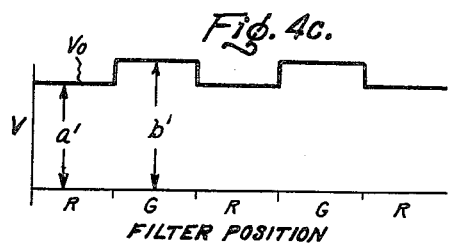

For the situation in which the green filter passes the greater amount of energy, the output $V_o$, as illustrated in FIGURE 4c, is such that it leads the reference voltage $V_r$ by 90°. Thus the output of the discriminator 23 is a direct current voltage of a sign opposite to that produced in the previous case. Since the output of the discriminator is utilized ultimately to drive the reversible balancing motor 27, it is clear that the motor will be driven in a direction dependent on the sign of the output from the discriminator.

Figure 4D:
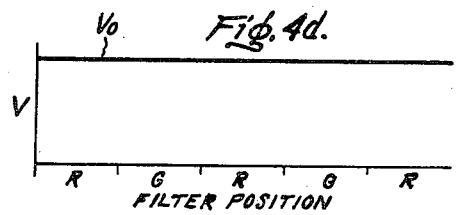

If the red and green filters 2 and 3 are so positioned that equal amounts of energy are transmitted the output signal from the radiation sensitive device, shown in FIGURE 4d, has no alternating component. Hence, the output of the phase discriminator 23 is zero, since no phase comparison can be made and the balancing motor 27 is quiescent.

The balancing motor 27 drives a shaft 28 which has mounted thereon a pinion 29 which meshes with a gear member 30. Mounted on the gear 30 is a hub member 31 which, in conjunction with a cable 33 and a pair of pulley wheels 32, moves the carriage 4 in a direction dependent on the direction of rotation of the balancing motor 27. The cable 33 is fastened to the carriage 4 by any convenient means and passes around the pulley wheels 32 and the hub 31. Thus, as the gear 30 is driven by the motor 27 through the pinion 29, the cable 33 moves the carriage 4 relative to the quartz rod 8 until that position along the wedge is reached where equal amounts of energy pass through each of the red and green filters and the output of the radiation sensitive device 6 becomes a direct current. This causes the output of the phase discriminator to go to zero, as is well known in the art, and stopping rotation of the reversible balancing motor 27.

The amount of rotation of the reversible balance motor 27, and consequently the amount of motion of the carriage 4, necessary to have equal amounts of radiant energy passing through the filters, is then a measure of the temperature of the heated source to be measured. Thus, by measuring the amount of rotation of the motor 27 it is possible to provide an indication of the temperature of the source. Hence, there is mounted on the shaft 28 an indicating instrument 34 which provides a measure of the rotation. The indicating instrument 34 may be any one of various well known types, such as variable potentiometers or transmitting synchros. The indicating device 34 may be calibrated directly in terms of temperature since, as has been pointed out, the amount of movement necessary to bring about a balance of energy passing through the filters is a measure of the temperature of the source.

In utilizing a radiation sensitive device of the photomultiplier type in a pyrometer apparatus it is desirable to prevent the introduction of errors due to saturation of the radiation sensitive device by large changes in light intensity. As a consequence, it is desirable to vary the sensitivity of the radiation sensitive device as an inverse function of the light intensity level falling on it. This may be achieved by controlling the magnitude of the energizing voltage applied to the radiation sensitive device so that as the intensity of the radiant energy falling thereon increases, the energizing voltage applied to it decreases and, inversely, if the intensity drops the high voltage increases. It is clear that such control of the sensitivity of the device will not affect the accuracy of the output reading of the device since a ratio of the energies in the respective bands is measured.

In order to achieve the above results the direct current component of the electrical output of the radiation sensitive device 6 is applied to the input of a direct current amplifier 21. The output of the direct current amplifier 21 is connected to the input of a high voltage source 22 whose output varies inversely with the magnitude of the direct current component. The output of the high voltage source 22 is connected by means of lead 22a to the radiation sensitive device 6 to provide energizing voltage.

Referring now to FIGURE 2, there is shown the electrical circuitry utilized of the apparatus of FIGURE 1 and illustrated there in block diagram form. FIGURE 2 shows a radiation sensitive device 6 of the photomultiplier type which comprises an anode member 40 and a photoelectric cathode element 41 upon which the radiant energy passing through the red and green filters 2 and 3 impinges. A number of secondarily emissive electrodes 42 are positioned between the cathode and the anode to provide electron multiplication. A voltage divider 43, one end of which is grounded and the other end of which is connected to a source of negative voltage with respect to ground, provides voltage for the photoelectric cathode 41 as well as the secondarily emissive electrodes 42. The divider voltage, as is well known, provides an electric field that tends to accelerate electrons moving from the cathode 41 to the anode 40 through the electrodes 42. An electron emitted from the cathode 41 strikes one of the secondarily emissive electrodes 42 causing the emission of secondary electrons therefrom. These secondary electrons then strike further secondarily emissive electrodes 42 liberating further electrons, this process continuing until a stream of secondary electrons strikes the anode 40 to produce an output signal which is coupled to the input of the alternating current amplifier 20 and the direct current amplifier 21. The negative voltage supplied to the voltage divider 43 is provided by a compensated power supply system which varies the magnitude of this negative voltage as an inverse function of the direct current component of the output and, consequently, of the light intensity on the radiation sensitive device.

The energizing voltage for the photomultiplier device is provided by a high voltage source 22 shown broadly by the dashed rectangle. This high voltage supply consists of an oscillator device 45 producing oscillations of variable amplitude. The oscillator 45 comprises a pair of electron discharge devices 46 and 47 of the triode type. The anodes and control electrodes of the two tubes are cross-coupled by means of a pair of series connected resistance-capacitance circuits 48 and 49. A parallel resonant circuit comprising a center tapped inductance 50 and a capacitance 51 is connected between the anodes of the tubes 46 and 47 and constitutes the frequency determining circuit of the oscillator.

A variable resistance means is utilized to control the amplitude of the oscillations produced by the oscillator means 45. A cathode follower 52 is connected between the center tapped inductance 50 and a source of unregulated high positive potential B+ and controls the anode voltage of the oscillator. The cathode follower device consists of electron discharge device having an anode 53, a cathode 54, and a control grid 55, the grid bias of which controls the effective resistance of the device. The effective resistance of the cathode follower in turn determines the anode voltage on the oscillator and consequently the amplitude oscillation.

The output of the oscillator 45 is coupled to a rectifying and filtering circuit to provide the unidirectional operational voltage for the radiation sensitive device 6. The oscillations generated in the resonant circuit are coupled to the rectifying circuit by means of transformer winding 57 one end of which is connected through rectifier 58 to ground and the other end of which is connected to the radiation sensitive device 6 by means of a resistance-capacitance filter 59. The rectifier 58 is so poled that current flows through the filter resistance in a direction to produce a voltage drop which is negative with respect to ground. The voltage divider 43 is connected between ground and one end of the resistance element of the filter 59 thus providing a voltage thereacross which is negative with respect to ground. Thus, the energizing voltage for the radiation sensitive device 6 is manipulated so that this voltage varies inversely with radiation intensity.

In addition to the source of unregulated positive voltage B+, a source of regulated voltage is provided. Connected in series between B+ and ground are a pair of gaseous voltage regulator tubes 60 and 61 and a resistance element 62. The voltage regulator tubes 60 and 61, as is well known in the art, maintain the voltages thereacross constant, irrespective of fluctuation in the source B+. Hence, there is provided at the respective anodes of the voltage regulator tubes 60 and 61 two regulated voltages which, in the instant case may be +250 and +100 volts. These two regulated voltages are utilized to provide operating voltage for various of the components in the circuitry of FIGURE 2.

As has been pointed out previously, the amplitude of oscillations produced by the oscillator 45 may be controlled by varying the grid bias on the control grid 55 of the cathode follower tube 52 in response to the magnitude of the direct current component from the radiation sensitive device 6. The magnitude of the oscillation should vary inversely with the magnitude of said direct current component in order that the sensitivity of the radiation sensitive device vary in the same manner with light intensity to prevent errors due to the saturation of said device. This control is achieved by means of a direct current amplifier 21, the output of which controls the grid bias of the cathode follower 52. The direct current amplifying means 21 consists of a first electron discharge device 63 having an anode member 64, a control grid 65, and a cathode 66. The anode member 64 is connected by means of a resistance 67 to a source of energizing voltage which, in the instant case, is the regulated +250 volt source at the anode of the voltage regulator tube 60. The cathode 66 is connected through a cathode resistance to ground. The anode 64 of the first amplifier 63 is directly connected to the input of a second electron discharge device 68 having an anode member 69, a control electrode 70 and a cathode 71.

The anode 69 of the second amplifier 68 is connected to the source of unregulated voltage B+ through a resistance 87, whereas the cathode 71 is connected to the regulated source of voltage of +100 volts at the anode of the voltage regulator tube 61. The consequences of the particular connection of the cathode of this tube will be explained in greater detail later. The anode 64 of the amplifier 63 is directly connected to the control grid 70 of the second direct current amplifier tube 68, and the anode 69 of which is, in turn, directly connected to the control electrode 55 of the cathode follower 52 and controls its effective resistance in a manner to be described later.

The direct current amplifying means 21 is connected to the output of the radiation sensitive device 6 by means of a lead 72 which is connected between the anode 40 of the photomultiplier and the control grid 65 of the direct current amplifier tube 63. The anode 64 of the amplifiers 63 is maintained, under normal operating conditions, at a voltage which is slightly less than +100 volts due to the drop in the anode resistance 67. Since the cathode 71 of the amplifier 68 is held at +100 volts, the control grid 70 which is connected directly to anode 64 of the amplifier 65 is slightly negative with respect to the cathode 71. By virtue of this connection any variation in the direct current level of the output from the radiation sensitive device 6 will produce an output signal from the amplifying means 21 which will vary the output voltage from the high voltage source 22 in such a direction as to maintain the direct current level constant.

Thus if, for example, the light intensity falling on the photoelectric cathode 41 increases, there is an increase of current flow through the photomultiplier tube and the voltage at the plate 40 of the photomultiplier tube is reduced. As a consequence, the control electrode 65 of the direct current amplifier 63, which is directly connected to the photomultiplier anode 40, becomes more negative, reducing the current flow through that tube and raising the voltage at the anode 64. Since the anode 64 is normally slightly negative relative to the cathode 71 of the amplifier 68, the bias voltage on the control grid 70 of the amplifier 68 becomes more positive. As a result, there is an increase of anode current flow in the amplifier 68 which causes an increased voltage drop in the anode resistor 87 and effectively causes the anode voltage to become more negative. Since the anode 69 of the amplifier 68 is connected to the control grid 55 of the cathode follower 52, the drop in anode voltage is reflected as an increasingly negative bias on the cathode follower tube. This reduces the current flow in tube 52 increasing its effective resistance and reducing the anode voltage of the oscillator 45. The reduction of the anode voltage of the oscillator circuit 45 causes a consequent reduction in the amplitude of the oscillations produced thereby and in turn reduces the voltage applied to the radiation sensitive device 6. Since the dynode voltage has been reduced the sensitivity of the device is reduced and the direct current component of the output is maintained constant.

In a similar fashion, should the reverse occur, that is, the light intensity be reduced, the system would operate to increase the output from the high voltage source and increase the sensitivity of the device in order to maintain the direct current level of the radiation sensitive device constant. In this manner the direct current reference level of the electric output from the radiation sensitive device is maintained constant and the output is not susceptible to errors due to saturation of the radiation sensitive device.

The alternating current component of the signal from the photomultiplier device which indicates which of the energies in the discrete bands is larger, is coupled to an alternating current amplifier and amplified therein prior to application thereof to a phase discriminating device. To this end there is provided an alternating current amplifying means 20 comprising a first amplifier 73 of the well known triode electron discharge type, the input of which is coupled by means of a coupling capacitor 74 to the anode 40 of the radiation sensitive device 6. The output of the amplifier 73 is connected by means of a coupling capacitor 75 to the input of a second amplifier 76. The anodes of the amplifying devices 73 and 76 are connected respectively to the regulated +250 source and the unregulated source of +B+ while their cathodes are connected to ground through cathode resistances. The amplifiers 73 and 76 which make up the amplifying means 20 function in a well known manner to amplify the alternating current components of the output from the photomultiplier. The output from the amplifying means 20 is applied to the input of a phase discriminating means 23.

Thus the anode of the amplifier 76 is connected to the primary 77 of a transformer element 78. A capacitance 79 forms a resonant circuit with the transformer primary which is resonant at the signal frequency and consequently rejects line frequency signals. In addition the resonant circuit acts as a wave shaping element imparting a sinusoidal configuration to the signal. The secondary 80 of the transformer 78 is connected across one pair of terminals of a balanced diode ring 81 which acts as the phase discriminating device. Connected across the remaining terminals of the diode ring 81 are a pair of terminals 82 to which the reference or timing signal from the reference signal generator 14 of FIGURE 1 is applied. A grounded center tapped voltage divider is connected across the terminals 82 to provide a reference source. Connected between a center tap on the secondary 80 and ground is a voltage divider 84 which has a direct current voltage developed thereacross which assumes a polarity dependent upon the phase relation of the two alternating current voltages applied to the diode ring phase discriminator 81. Connected across a portion of the voltage divider 84 is a lead 85 connected to an output terminal 86. The output terminal 86 is connected to the balancing motor amplifier 25 of FIGURE 1.

The polarity of the direct current output across the voltage divider 84, as was explained with reference to FIGURE 1, selects the direction of rotation of the balance motor 27 of FIGURE 1. If the alternating current component of the voltage from the radiation sensitive device 6 goes to zero, that is equal amounts of energy being transmitted to each of the filters, the output of the discriminator 81 also goes to zero and the balancing motor stops.

It is obvious from the previous discussion that although the filters 2 and 3, for the sake of illustration, have been described as a band pass filter in the infrared and green bands respectively, these are by no means limiting conditions and are utilized merely for simplicity of explanation and to provide a clear-cut example. It is obvious that band pass filters of many different types may be utilized in carrying out the principles of the instant invention. The only limiting condition being that the discrete bands of wavelengths be separated sufficiently so as to provide a clear-cut indication.

In addition, it is also to be understood that a filter other than a physical wedge, such as illustrated at 3 in FIGURE 1, may be utilized in order to provide the varying transmission characteristic in a selected band of wavelengths. That is, in FIGURE 1 a physical wedge has been illustrated; however, it is well known to those skilled in the art that filters having constant physical thickness but varying degrees of transmission along the length thereof are available. That is, a photographic film which has been exposed and developed to have a graduated optical density along its length may, of course, be utilized.

In the pyrometer apparatus illustrated in FIGURE 1 the electrical output from the radiation sensitive device is applied to a phase discriminator wherein the phase of the signal is compared to that of an output from a reference voltage generator. The output of the phase discriminator is applied through a converter and balancing motor amplifier to a motor in order to bring the system to a null balance point. It is possible to provide simplified pyrometer apparatus embodying the principles of the instant invention by eliminating the phase discriminator and associated circuitry and applying the output from the radiation sensitive device directly to the balancing motor in order to drive the apparatus to a null or zero position.

FIGURE 5 illustrates such an alternative form of the pyrometer apparatus. The transducing mechanism for the radiant energy emitted by the heated source illustrated in FIGURE 5 is essentially the same as that of FIGURE 1. There is provided a selective transmission means 101 which has selective wavelength characteristics for at least two distinct bands of wavelengths in a received radiation spectrum. There is provided a first filter element 102 characterized by the fact that it will pass only a selected band of wavelengths which, in a manner similar to that described in FIGURE 1, may be near the infrared end of the spectrum. The filter element 102, which is the red filter, is further characterized by the fact that its transmission characteristics within the selected band is constant along all points of the filter element.

Positioned on top of the red filter 102 and fastened thereto is a filter element 103 which is a physical wedge element with a lengthwise taper which passes a band of wavelengths in another portion of the spectrum such as, for example, the green. The transmission characteristics of the filter within this selected band varies with the position along the taper. The filters 102 and 103 are positioned on a carriage means 104 which is, in turn, movably mounted on a pair of tracks 105 and along which the carriage is adapted to move.

Positioned on one side of the red and green filter elements is a radiation sensitive device 106 of the photomultiplier type. The radiation sensitive device 106 as explained in detail with reference to FIGURE 1 produces an electrical output whose phase is dependent on which of the two filters passes the larger amount of energy, and whose magnitude is proportional to the ratio of the energies passing through the respective filters.

Arranged on the other side of the filters is a movable remote transmitting means of the same type illustrated in FIG. 1. An elongated flexible quartz rod 108 is positioned within and supported by a hollow thin wall stainless steel tubing 109 which is essentially a protective housing or casing for the quartz transmission member. One end of the quartz rod is positioned within or closely adjacent to the heated source whose temperature is to be determined whereas the other end is positioned in juxtaposition to the filter elements 102 and 103.

The flexible quartz rod 108 is oscillated transversely to the band pass filters 102 and 103 so as to apply the radiation spectrum alternately through the filters onto the radiation sensitive device 106. To achieve this result the quartz rod is supported at one end thereof by a rocker arm 110 which is actuated in a reciprocating fashion. A reciprocating motion is imparted to the rocker arm 110 by means of a cam member 111 which has its cam surface in physical contact with one end of the rocker arm. The cam member 111 is eccentrically and adjustably mounted on a shaft 112 which is driven by a motor 113. The rotation of the cam member 111 moves the rocker arm up and down in a reciprocating manner and in turn moves the quartz rod in synchronism therewith.

The cam member 111 is fastened to the shaft 112 in an adjustable manner by means of a movable pin 111a in order to adjust the relative position of the cam 111 and the shaft 112 for purposes which will be explained in detail later.

There is provided a reference voltage signal generator operating in synchronism with the cam member 111 and, as a consequence, with the movement of the quartz transmitting rod. The reference generator 114 comprises a circular magnetically polarized rotor member 115, as indicated by the reference numerals N and S, fastened to the shaft 112 and positioned in the air gap of a core member 116. Mounted in flux exchange relationship with the core member 116 is a coil member 117 which will have induced therein an alternating voltage whose frequency is synchronous with the rotation of the cam member 111 and consequently with the movement of the quartz rod 108. The coil 117 is connected by means of leads 118 directly to one of the field windings of a reversible two-phase motor 119 which acts as the balance motor. The position of the cam member 111 may be so adjusted by means of the pin 111a, relative to the polarized portions of the rotor 115, that the reference voltage provided by the generator 114 normally assumes a 90° phase relationship with the output of the radiation sensitive device 106.

The electrical output of the radiation sensitive device 106 is characterized by the fact, as was explained in detail with reference to the apparatus of FIGURE 3 and the waveforms of FIGURES 3a–3c, that it contains an alternating current component whose phase is dependent on which of the filters 102 or 103 passes the larger amount of energy and whose magnitude is dependent on the ratio of the energy. The output leads 120 of the radiation sensitive device 106 are connected to the input and alternating current amplifier 121 which serves to amplify the alternating current component of the output from the radiation sensitive device. The ouput of the alternating current of the amplifier is connected to the quadrature field winding of the two phase motor 119.

The reference voltage from the generator 114, as has been pointed out previously, is maintained, by virtue of the manipulation of the relative positions of the cam member 111 and the generator rotor 115, at a 90° phase difference relative to the output of the radiation sensitive device. That is, the reference voltage is maintained at 90° phase difference to the output of the radiation sensitive device for the two out-of-balance conditions of that output. As has been illustrated with reference to FIGURES 3a–3c, the output of the radiation sensitive device has alternating current components which are 180° out of phase, depending on which of the filters passes the greater amount of energy. As a consequence, the voltage applied to the quadrature field of the two phase motor 119 is either 90° ahead or 90° behind the reference voltage applied to the other field winding, depending on which of the filters passes the greater amount of energy, causing rotation of the motor in either direction until balance is reached, at which time the signal to the quadrature field is eliminated and the motor stops.

The balancing motor 119 drives a shaft 122 which has mounted thereon a pinion 123 meshing with a gear member 124. Mounted on the gear 124 are hubs 125 which drive a cable 126 over a pair of pulley wheels 127. Cable 126 is fastened to the carriage 104 by any convenient means and moves the carriage in response to rotation of the motor 119 and the gear member 124. Thus, as the gear 124 is rotated, the cable 126 moves the carriage 104 relative to the quartz rod 108 until equal amounts of energy pass through each of the red and green filters 102 and 103 and the output of the radiation sensitive device 106 becomes a direct current and stopping rotation of the reversible balancing motor 119.

The amount of rotation of the reversible balance motor 119 is again a measure of the temperature of the heated source. Consequently, by measuring the amount of rotation an indication of the temperature of the source is provided. Thus, in a manner similar to that described with reference to FIGURE 3 an indicating instrument 128 is mounted on the shaft 122 to provide a measure of the rotation. This indicating instrument may similarly be a potentiometer or transmitting synchro which provides an index of the amount of movement and may be calibrated directly in terms of temperature.

The power supply for the radiation sensitive device 106 is of the type described with reference to FIGURE 1 and varies the sensitivity of the device as an inverse function of the light intensity level falling thereon. To this end the direct current component of the electrical output of the radiation sensitive device 106 is applied to the input of the direct current amplifier 129, the output of which is connected to the input of a high voltage source, of the type described with reference to FIGURE 2 whose output varies inversely with the magnitude of the direct current component. The output of the high voltage supply 130 is connected by means of lead 131 to the radiation sensitive device 106 in order to provide controlled energizing voltage therefor.

In the apparatus hitherto illustrated in FIGURES 1 and 5 the radiant energy transmitting quartz rod moves relative to the filter element. It is possible, however, to maintain the quartz rod fixed and move the filters in order to apply the radiation spectrum alternately to said filters.

FIGURE 6 illustrates an embodiment of the transducer mechanism which may be utilized with the general circuitry of FIGURES 1 and 5. There is shown an elongated flexible quartz rod 140 mounted in a hollow thin walled stainless steel protective tubing which functions as the radiant energy transmitting means. A radiation sensitive device 141 which may be of the photomultiplier type, is positioned so as to be in alignment with one end of the radiation transmitting quartz rod 140.

Positioned between the radiation sensitive device and the end of quartz rod 140 is a filter means 142 of circular configuration comprising a pair of semi-circular band pass filter elements 143 and 144. The semi-circular portion 143 is a band pass filter of fixed thickness centered in the infrared and has a constant transmission characteristic within the selected band of wavelengths. The other semicircular filter means 144 transmits a band of wavelengths centered generally in the green portion of the spectrum and is a wedge of radially varying thickness. Thus, the transmission characteristic and hence the amount of radiant energy transmitted by the band pass filter 144 is directly related to the radial position. In the red filter 143 on the other hand, the transmission characteristic is constant for all points along the radius.

There is provided a means for rotating the filter means 142 at a constant speed in order to apply the radiation on the heated source alternately to the filters 143 and 144. To this end a constant speed motor 145 drives a shaft 146 upon which the filter means 142 is mounted. In this manner the filters 143 and 144 cyclically pass between radiation transmitting member 140 and the radiation sensitive device 141. As a consequence, the radiant energy impinging upon the device 141 is alternately in the two selected bands of wavelengths representing the band pass characteristic of the filter elements. The output of the radiation sensitive device 141, in a manner similar to that described with reference to FIGURES 1 and 5, has an alternating current component whose phase is dependent on which of the filters passes the larger amount of radiant energy and whose magnitude is dependent upon the ratio of these energies.

The constant speed motor 145 also drives a reference voltage generator 147 of the type illustrated in FIGURE 1 to produce a reference or timing signal in synchronism with the rotation of the filter means 142. The output from the reference voltage generator 147 may be compared with the output of the radiation sensitive device 141 in a discriminator means, as illustrated in FIGURE 1, or applied directly to a balance motor as illustrated in FIGURE 5, to control the movement of the transducer until a null balanced position is reached.

The motor 145 and the reference generator 147 are mounted on a movable platform carriage means 148. The carriage 148 is moved up and down so as to control the position of the radiant energy transmitting rod along the radius of the filter element. To this end, there is provided a rack and pinion arrangement 149 which may be driven by means of a balancing motor 155, of the type illustrated in the prior embodiments, to move the carriage 148 and the filter 142 in such a manner that the position of the transmitting rod 140 along the radius of the filter 144 is such that equal amounts of energy impinge upon the radiation sensitive device 141. Consequently, the radial distance along the filter element 144 becomes a direct measure of the temperature in a manner similar to that explained with reference to FIGURE 1. The amount of movement of the rack and pinion arrangement 149 to move the carriage 148 to achieve a null balance point may be indicated in a manner similar to that illustrated in FIGURE 1 as a measure of temperature.

It may also be desirable to utilize a rotating sector wheel type optical wedge in place of the rotatable optical wedge of FIGURE 6. Such a sector type of wedge is illustrated in FIG. 7 wherein the disc 150 provides this type of wedge when it is rotated rapidly about its axis 151. The lower half of the disc portion 152 is again constituted of a material which transmits wavelengths in a selected band within the infrared region. The upper portion of the disc is constituted of a portion 153 of variable radius which passes a selected band of wavelengths in the green portion of the spectrum. The remaining portion of the upper semi-circle is constituted of an opaque material 154 which does not permit the transmission of any energy. The radius of the green portion 153 varies so that as it rotates light rays may pass the disc in the selected band with an attenuation which is a function of their distance from the disc center. For example, rays which are distant from the center by an amount just slightly less than the greatest radius of the portion 153 pass during a small part of each rotational cycle during which the radiant energy is transmitted onto the upper semi-circle of the disc, and thus are highly attenuated. Rays nearer the center of the disc are intercepted by the disc for a lesser portion of each cycle and thus are less strongly attenuated.

The resultant effect is that of an annular optical wedge, radially graduated in opacity with the most opaque portion near the periphery. Thus, the transmission characteristic of the green band pass filter varies with radial distance. By controlling the time the radiant energy is permitted to pass through the green filter during each cycle the total amount of energy in the green wavelength which is permitted to fall upon the radiation sensitive device is controlled.

The advantage of a rotating sector wheel type of wedge is that it provides minimum scattering of light by the wedge. Thus, the same effect is achieved as with a physical wedge, such as illustrated in FIGURE 6, without the necessity of constructing such a wedge element with its attendant difficulties of construction.

From the foregoing description it can be appreciated that the instant invention provides a high temperature pyrometer having great sensitivity, speed of operation, and accuracy in measuring temperature which utilizes a null balancing principle for measuring the color temperature of a heated object.

While particular embodiments of this invention have been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. A continuous null balancing remote indicating pyrometer comprising, a radiation sensitive device, a flexible quartz rod for transmitting the radiation spectrum from a heated source to said sensitive device, a filter means positioned between said rod and said device comprising a first semi-circular band pass filter having a constant transmission characteristic, a second semi-circular different band pass filter having a radially varying transmission characteristic, drive means for producing relative rotation between said filter means and said rod so that a circular path is described and said radiation spectrum is transmitted to said sensitive device alternately through said first and second filters to produce an electrical output proportional to the energy passed in each band, and means responsive to said electrical output for radially positioning said rod relative to said filter means until equal amounts of energy are passed.

2. The pyrometer of claim 1 in which said first filter means is of constant thickness and the thickness of said second filter means varies radially.

3. The pyrometer of claim 1 wherein said second filter means includes an opaque portion and an energy transmitting portion so that the circular path includes varying lengths of the opaque and transmitting portions.

4. The pyrometer of claim 3 wherein the opaque and transmitting portions are so shaped that the length of path in the transmitting portion varies radially.

References Cited in the file of this patent
UNITED STATES PATENTS

| | | |
|---|---|---|
| 1,813,521 | Wolfe | July 7, 1931 |
| 1,898,219 | Sharp | Feb. 21, 1933 |
| 2,132,048 | Robinette | Oct. 4, 1938 |